Figure 3:
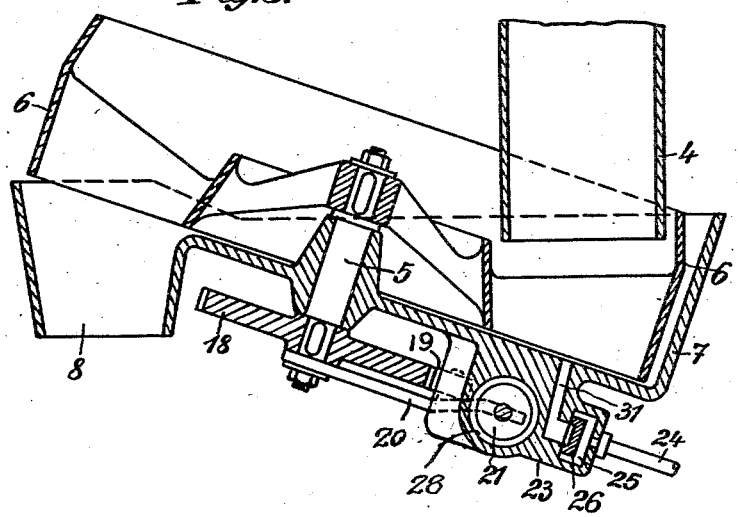

May 21, 1929.  M. SCHWABACH  1,713,718
METHOD AND MEANS FOR REMOVING FURNACE RESIDUES
Filed Sept. 15, 1925  2 Sheets-Sheet 1
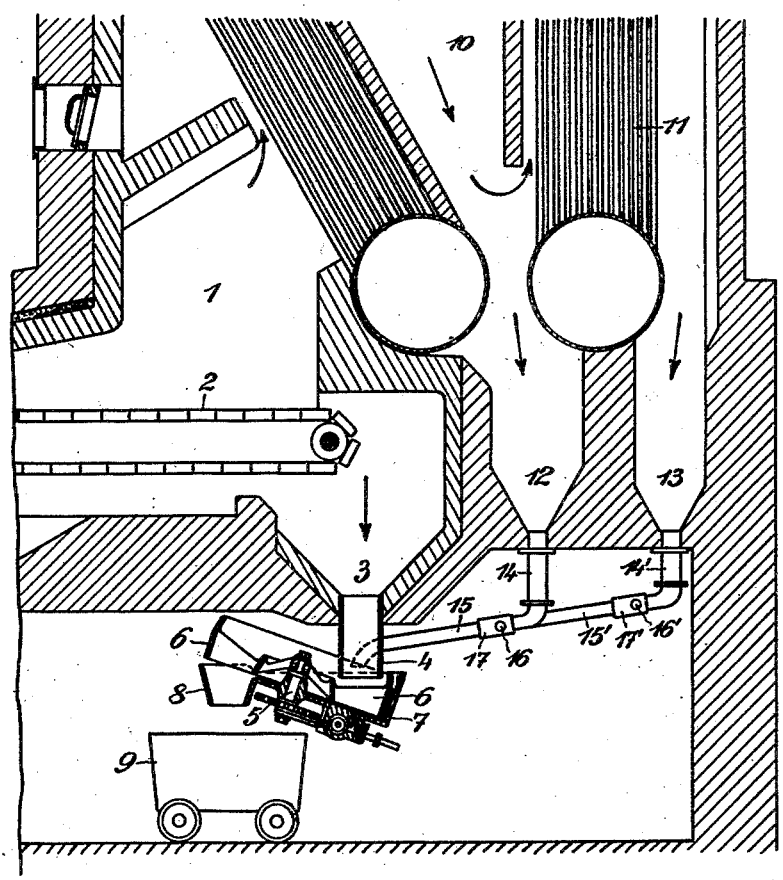
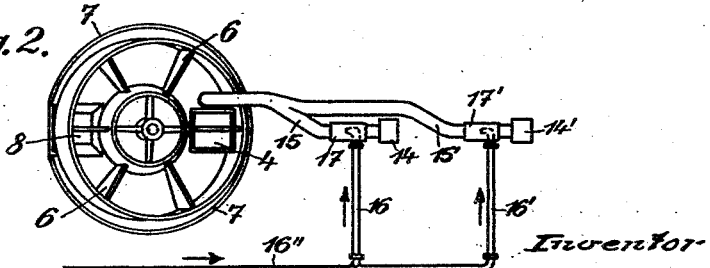
Inventor
M. Schwabach May 21, 1929. M. SCHWABACH 1,713,718
METHOD AND MEANS FOR REMOVING FURNACE RESIDUES
Filed Sept. 15, 1925 2 Sheets-Sheet 2

Inventor
M. Schwabach

Patented May 21, 1929.

1,713,718

UNITED STATES PATENT OFFICE.

MAX SCHWABACH, OF BERLIN-HALENSEE, GERMANY.

METHOD AND MEANS FOR REMOVING FURNACE RESIDUES.

Application filed September 15, 1925, Serial No. 56,534, and in Germany September 23, 1924.

My invention relates to a method of removing, or carrying away, the coarse and the fine residues of furnaces by water under pressure, as well as to a device for carrying this method into practice. I am aware of the existence of devices in which water is used for removing, or carrying away, furnace residues, but these devices are only able to carry away the fine residues, whereas the coarse ones, such as slag and the like, must be caused to pass through a disintegrating machine, as, for instance, a slag breaker which consumes power, but does not reduce the coarse particles to such fineness that the product can be washed away reliably. It is therefore not possible to prevent, with the known devices and even with a large consumption of water, obstructions of the conduits, and it is, in view of this possibility, rendered necessary to employ a high pump pressure whereby the costs of operation are considerably increased.

I am also aware of the fact that it is known to remove and carry away the coarse particles by means of conveying devices moved mechanically in a trough containing water. These apparatus operate reliably, it is true, and their service costs are low, but a sufficient utilization is possible only where a comparatively large amount of residues is to be treated, which is not the case however, as regards the small amounts of flue dust and the like deposited in the rear flues of boilers, in uptakes, main flues, economizers, and the like.

The various drawbacks experienced with the known devices are completely done away with by my improved method, the gist of which is that the fine furnace residues, such as flue dust and the like, are first carried by water, preferably by intermittent rushes thereof, into the quenching receptacle receiving directly the coarse furnace residues, whereafter they are conveyed further together with the coarse residues by means of a mechanically moved conveying device. This device which may be a stirring device of any suitable known type that either is turned in a water trough like a wheel or is moved straightway forward in a suitably shaped trough is actuated, by water under pressure whereby the otherwise required motors for operating devices of the kind mentioned are rendered superfluous, whereas the water used for driving the respective device can be utilized thereafter for replacing the water consumed partly by evaporation when the hot residues are being quenched, and partly by being employed for moistening thoroughly the quenched material.

Figure 4:
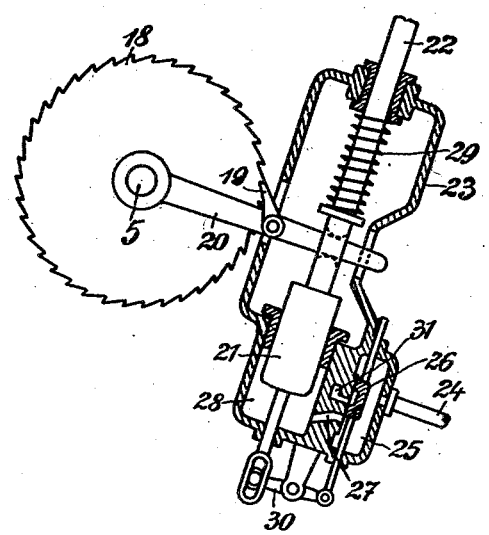

My invention is illustrated diagrammatically and by way of example in the accompanying drawings in which Figure 1 is a vertical longitudinal section through the rear part of a boiler-furnace equipped with my invention; Figure 2 is a plan of the rotary device (6, 7, 8) shown in the lower part of Fig. 1 and serving for removing the furnace residues; Figure 3 shows the same device in vertical section, as in Fig. 1, but drawn to a greatly enlarged scale relatively to Fig. 1; Figure 4 is a bottom-view of the members shown in the lower part of the righthand half of Fig. 3, most of these members being shown in section, the plane of section lying obliquely, corresponding to Fig. 3.

Referring to Fig. 1, 1 denotes the furnace of a boiler provided with a travelling grate 2. The coarse residues, as slag and the like, fall from the rear end of said grate down into a hopper 3 from which extends downwardly a wide tube 4 terminating into a mechanically moved conveying device consisting of an obliquely arranged blade-wheel 6 rotating in a circular vessel 7 having an oblique bottom and, diametrically opposite to the lowest portion of said bottom, a discharge aperture 8 to which the residues are conveyed by the bladed wheel 6 and through which they are discharged either into a truck 9 or into a conveying trough or onto an endless conveying band, or the like.

The flue gases rising from the grate pass through the rear boiler flues 10 and may wash auxiliary devices, such as a pre-heater 11 or the like provided, perhaps, in any one of said flues, the flue-dust, small particles of slag, and the like, carried along with the flue gases being retained and collected in chambers 12 and 13 which have hopper-shaped bottoms and from which the mixture of the flue dust, the particles of slag, and the like, get into small tubular receptacles 14 and 14' from which extend tubes 15 and 15' to the bladed wheel 6 and the vessel 7, as shown in Fig. 1. Pipes 16 and 16' discharging into chambers 17' and 17" are inserted into said tubes 15 and 15', which pipes 16 and 16' are connected with conduits 17 through which water under pressure is supplied in order to empty the receptacles 14, 14' by this water.

The mixture of the water and the fine particles of dust, slag etc. is conducted through the tubes 15 15' into the vessel 7 in which the water and said particles separate, these latter depositing upon the bottom of said vessel, and the water being conducted away, if desired, through an overflow pipe. As the amount of the fine particles to be removed from the receptacles 14 14' is only comparatively small, and the tubes 15 15' are only short, it is not necessary to supply the water under pressure continually; it is sufficient to supply it periodically.

It is also not necessary that the two receptacles 14 14' be emptied both at a time; they may be emptied in alternation and the intervals may be determined according to the amounts of the particles accumulated in said receptacles.

The fine furnace residues deposited in the vessel 7, as well as the coarse particles introduced therein through the wide pipe 4, are removed together from the vessel 7, in the example shown, by means of the bladed wheel 6, the shaft 5 of which is provided with a ratchet-wheel 18 engaged by a pawl 19 attached to a lever 20 connected in any suitable manner with the rod 22 of a piston 21 pertaining to a hydraulic motor 23 (Fig. 4). Water under pressure is introduced through the pipe 24 into the slide-valve casing 25 in which the slide-valve 26 is reciprocated automatically. When the slide-valve is in the position shown in Fig. 4, the water flows through the passage 27 into the cylinder 28 and moves the piston 21 whereby a helical spring 29 will be compressed. As the piston rod 22 and the arm or lever 20 are coupled with each other, the pawl 19 turns the ratchet-wheel 18, the shaft 5, and the blade wheel 6.

The slide-valve rod is coupled with a rearwardly projecting guide-rod of the piston by a double-armed lever 30, these members constituting a link motion for the slide-valve which is being shifted when the spring 29 has been compressed. Now the passage 27 communicates no more with the slide-valve casing, or with the pressure pipe 24 respectively, but with the discharge passage 31 of the hydraulic motor, in consequence whereof the now relieved spring 29 moves the piston 21 back into its initial position. As the channel 31 terminates at the bottom of the vessel 7 (Fig. 1), the water contained in the cylinder 28 is pressed into said vessel by the returning piston 21, and when the piston is just about to assume its original position, the slide-valve 26 is being again reversed by the link motion described and the movements described are repeated, and so on, the blade-wheel being turned intermittently thereby.

In order to supply the water under pressure periodically and automatically, a cock 32 to which is attached a disc 33 provided on its periphery with pins 34 is inserted into the conduit 17. The peg 35 of the wheel 6 pushes against one of the pins 33 when the wheel 6 is rotated and turns the cock 32 so that the water-way is opened and closed periodically and automatically.

Although the pressure of the water in the mains is generally sufficient to drive the individual apparatus, water of a higher pressure may be used which permits at the same time to reduce the dimensions of the device. Such water is always available where a steam-plant exists; the pressure-water cylinder of the apparatus is connected up preferably to the pressure pipe connecting the feed-pump with the economizer, or with the boilers themselves. No larger feed-pump is required, as the water necessitated for the ashes-separator is only a fraction of the amount of feed-water required for the boilers.

It is also very suited to the purpose to provide in a plan in which in general ordinary town-main water is used a separate connection between the driving cylinder and a high-pressure pipe, as for instance the feed-pipe of the boiler-plant, so that in case of need, that is to say, if unusually large resistances are to be overcome or if uncommonly large amounts of slag formed by a strongly slaggy sort of coal are to be removed the driving piston can be subjected to a higher pressure for the time being.

I claim:

1. A device for discharging coarse and fine furnace residues comprising in combination, a furnace having an ash receiving chamber and settling chamber in the rear thereof, means for removing the residue, said means including a quenching vessel located below the rear end of the combustion space of the furnace, a tube connected between the rear end of said space and said vessel adapted to convey the coarse furnace residues into the vessel, chambers provided behind the furnace adapted to receive the fine residues, pipes connecting said chambers with said quenching vessel, means for introducing water under pressure into said pipes, a conveying device arranged in said vessel and adapted to be moved mechanically, means for operating the conveying device by water under pressure and for introducing this water after having operated the conveying device into the quenching vessel for use as a quenching medium.

2. A quenching vessel to receive and discharge the coarse and fine furnace residues, including a quenching tank, an element mounted for rotation therein and having blades to move over the bottom of the tank, said tank being formed with a discharge outlet to permit the passage therefrom of the material moved by the blades of the element, and a water-driven motor for operating the element, the water exhaust from the motor being directed into the tank for use as a quenching fluid.

3. A quenching vessel for receiving and discharging the coarse and fine furnace residues, comprising a quenching tank arranged at an inclination to the horizontal and formed at the higher end with a discharge outlet, a rotating series of blades operating over the bottom of the quenching vessel to carry the material from the lower end of such vessel to the discharge outlet, a water-operated motor for actuating the blades, the exhaust water from the motor being directed into the tank at the lowest portion thereof to serve as quenching water, the material being discharged into the tank in line with the incoming motor exhaust water.

In testimony whereof I affix my signature.

MAX SCHWABACH.